(12) United States Patent
Reed et al.

(10) Patent No.: US 6,367,202 B1
(45) Date of Patent: Apr. 9, 2002

(54) DOOR MODULE HAVING AN ENCLOSURE AND SPEAKERS FOR AN AUTOMOTIVE VEHICLE

(75) Inventors: Daniel P Reed, Warren; Michele Ann Feath, Brighton, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/298,075

(22) Filed: Apr. 22, 1999

Related U.S. Application Data

(60) Provisional application No. 60/082,641, filed on Apr. 22, 1998.

(51) Int. Cl.[7] .............................. H04R 1/02; B60J 5/04
(52) U.S. Cl. ......................... 49/502; 381/86; 381/389; 296/146.5
(58) Field of Search .......................... 49/501, 502, 348, 49/349; 296/146.5, 146.7, 152; 181/148; 381/86, 386, 389

(56) References Cited

U.S. PATENT DOCUMENTS

| 4,090,582 A | | 5/1978 | Deschu |
| 4,337,380 A | | 6/1982 | Tezuka et al. |
| 4,572,326 A | | 2/1986 | Hutchins |
| 4,728,143 A | | 3/1988 | Tanino et al. |
| 4,790,407 A | * | 12/1988 | Yamamoto et al. ......... 181/141 |
| 4,905,860 A | | 3/1990 | Kurihara et al. |
| 4,943,109 A | * | 7/1990 | Skrbina et al. .......... 296/146.4 |
| 5,095,659 A | * | 3/1992 | Benoit et al. .................. 49/502 |
| 5,287,412 A | * | 2/1994 | Etzel et al. ..................... 381/86 |
| 5,355,629 A | | 10/1994 | Kimura et al. |
| 5,532,437 A | | 7/1996 | Simplicean et al. |
| 5,535,553 A | | 7/1996 | Staser et al. |
| 5,548,930 A | * | 8/1996 | Morando ..................... 49/502 |
| 5,584,144 A | | 12/1996 | Hisano |
| 5,663,534 A | * | 9/1997 | Von Hagen et al. ........ 181/141 |
| 5,931,682 A | * | 8/1999 | Takiguchi et al. ............. 439/34 |
| 5,996,727 A | * | 12/1999 | Blind et al. .................. 181/141 |
| 6,139,088 A | * | 10/2000 | Okamoto et al. ........ 296/146.6 |
| 6,226,927 B1 | * | 5/2001 | Bertolini et al. .............. 49/502 |

FOREIGN PATENT DOCUMENTS

| DE | 4409542 | * | 10/1994 | .................. 381/86 |
| JP | 6237212 | * | 2/1987 | .................. 49/502 |
| JP | 4325337 | * | 11/1992 | .................. 381/86 |

* cited by examiner

Primary Examiner—Gregory J. Strimbu
(74) Attorney, Agent, or Firm—Steven L. Oberholtzer; Brinks, Hofer, Gilson & Lione

(57) ABSTRACT

A door module for instillation into a door of an automotive vehicle, one embodiment of which comprises: a generally rigid hollow interior enclosure having an interior chamber opposed generally vertical inboard and outboard walls, opposed generally vertical forward and rearward walls, a generally horizontal bottom wall and a top wall. The enclosure is configured such that the top wall transitions from a generally horizontal portion thereof proximate the rearward wall to a generally inclined portion thereof proximate the forward wall. The inboard wall includes a hole defined therein for sealably receiving an audio assembly.

5 Claims, 6 Drawing Sheets

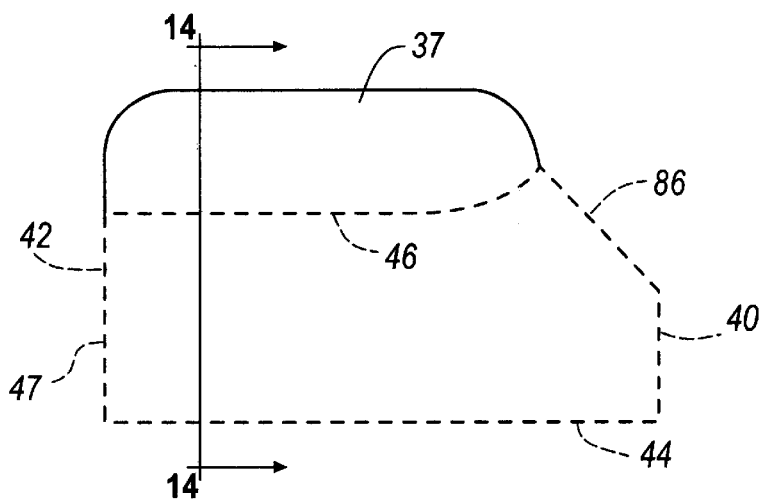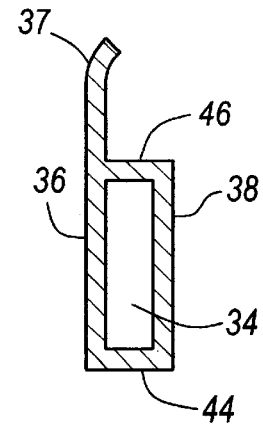
FIGURE - 12          FIGURE - 14
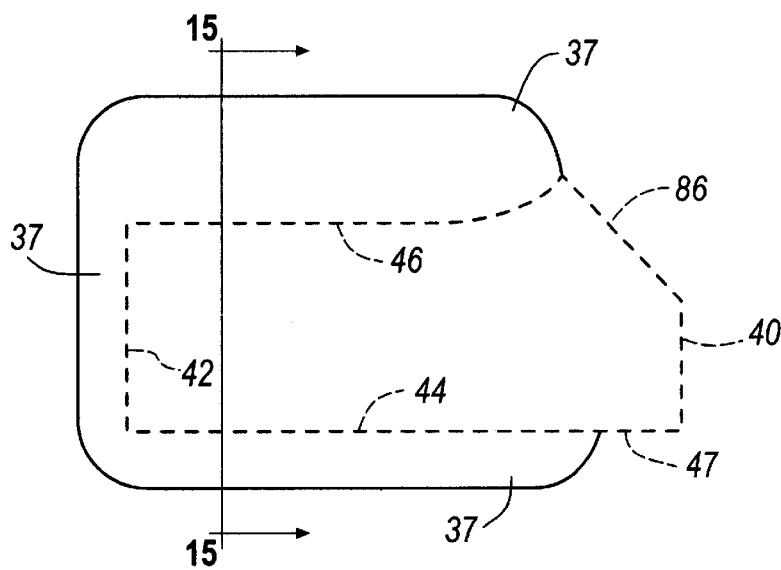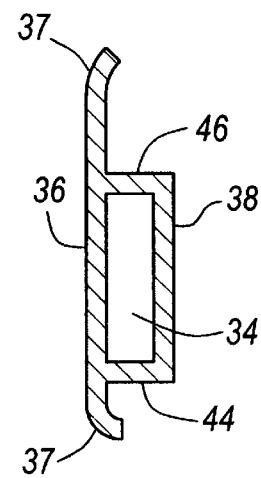
FIGURE - 13          FIGURE - 15

DOOR MODULE HAVING AN ENCLOSURE AND SPEAKERS FOR AN AUTOMOTIVE VEHICLE

This application claims the benefit of U.S. Provisional Application No. 60/082,641, filed Apr. 22, 1998.

BACKGROUND OF THE INVENTION

1. Field of the Invention

The present invention relates generally to automotive vehicles, and more particularly to doors for automotive vehicles.

2. Disclosure Information

FIGS. 1 and 2 illustrate a common type of door construction for automotive vehicles. The door 10' includes inner and outer structural walls 14/22 (typically made of sheet metal), a window glass plane 16 (within which the window glass is raised and lowered) intermediate the inner and outer structural walls, and a trim panel 18. (The trim panel 18 may comprise a single piece covering most of the door, or an upper trim panel and a lower trim panel which abut/overlap one another, or the like.) Also included in the door are a window regulator system 22, a door latching system 24, a door function control keypad 26 (for locking/unlocking door locks, raising/lowering windows, adjusting mirrors, etc.), a watershield sheet 28 for sealing out noise and moisture, an audio speaker assembly $20_1$ (e.g., a mid-range/tweeter combo), plus a large assortment of brackets, fasteners, and other hardware. Although the configuration shown in FIGS. 1A and B is commonly used, it requires the ordering, tracking, inventorying, handling, and assembly of a large number of parts; this adds to the overall complexity and cost of the door.

When a driver desires to install a sub-woofer or other speaker assembly which benefits from being housed in a sealed enclosure, the typical practice is to place the sub-woofer(s) or other speaker(s) in the rear trunk compartment of the vehicle. This is done because the volume required for most sub-woofers is relatively large—e.g., on the order of at least 10 to 12 liters for a 6½-inch sub-woofer and at least 15 liters for an 8-inch sub-woofer. However, for various vehicle design reasons it may be desirable to locate such enclosed speaker systems in other areas of the vehicle.

SUMMARY OF THE INVENTION

The present invention overcomes the disadvantages of the conventional prior art approaches by providing a specially designed door module for an automotive vehicle. In one embodiment, the door module comprises: a generally rigid hollow enclosure having an interior chamber, opposed generally vertical inboard and outboard walls, opposed generally vertical forward and rearward walls, a generally horizontal bottom wall, and a top wall. The top wall transitions from a generally horizontal portion thereof proximate the rearward wall to a generally inclined portion thereof proximate the forward wall. The inboard wall has a first hole defined therein for sealably receiving a first audio speaker assembly, such that the first hole communicates with the interior chamber of the enclosure.

It is an object and advantage that the present invention provides an enclosure for one or more audio speaker assemblies within a door of an automotive vehicle.

Another advantage is that the present invention provides a drop-in, modular design for a door module which may incorporate an enhanced enclosure for a sub-woofer and/or other speaker(s), an integral trim panel, and additional door hardware such as a window regulator system, a door latching system, a watershield, and the like.

These and other advantages, features and objects of the invention will become apparent from the drawings, detailed description and claims which follow.

BRIEF DESCRIPTION OF THE DRAWINGS

FIGS. 12–13 are side schematic views of two embodiments of the door module having flangelike trim portions integral with the inboard wall, as viewed from an outboard perspective.

FIGS. 14 and 15 are side sectional schematic views taken along lines 14—14 and 15—15 of FIGS. 12 and 13, respectively.

DETAILED DESCRIPTION OF THE PREFERRED EMBODIMENTS

Figure 1A:
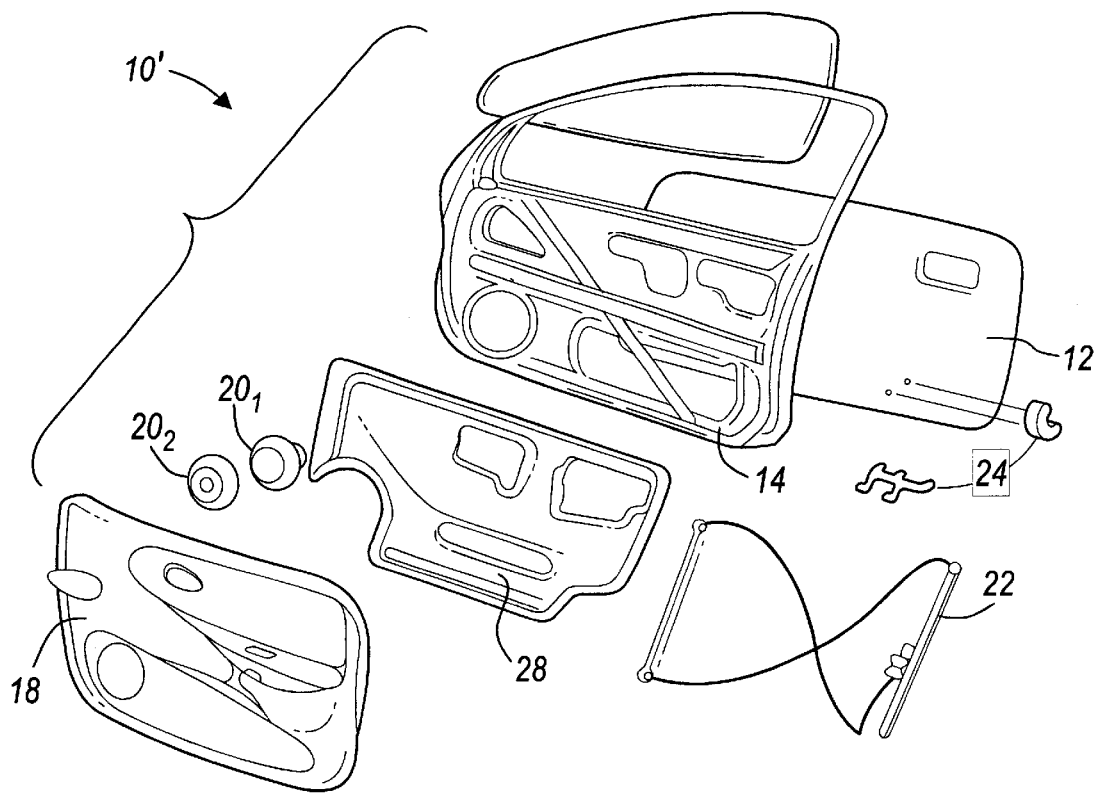
FIGS. 1A–B are exploded perspective and top sectional schematic views, respectively, of a door for an automotive vehicle according to the prior art.
Figure 1B:
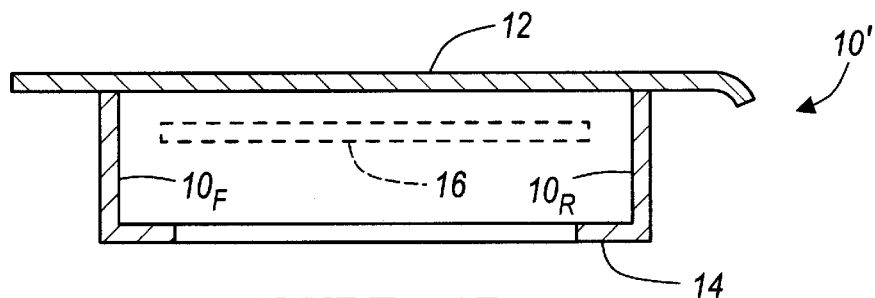

Referring now to the drawings, FIGS. 2–15 show a door module 30 for a door 10 of an automotive vehicle according to the present invention. In one embodiment, the door module 30 comprises: a generally rigid hollow enclosure 32 having an interior chamber 34, opposed generally vertical inboard and outboard walls 36/38, opposed generally vertical forward and rearward walls 40/42, a generally horizontal bottom wall 44, and a top wall 46. The top wall 46 transitions from a generally horizontal portion $46_H$ thereof proximate the rearward wall 42 to a generally inclined portion $46_I$ thereof proximate the forward wall 40. The inboard wall 36 has a first hole 48 defined therein for sealably receiving a first audio speaker assembly $20_1$, such that the first hole 48 communicates with the interior chamber 34 of the enclosure 32.

To assist the reader in understanding the present invention, all reference numbers used herein are summarized in the table below, along with the elements they represent:

10=Door
$10_A$=Armrest portion of door
$10_F$=Forward edge of door $10_R$=Rearward edge of door
$10_B$=Bottom edge of door
12=Outer structural wall
14=Inner structural wall
16=Window glass plane
18=Trim panel
$20_n$=$n^{th}$ audio speaker assembly
22=Window regulator system
24=Door latching system
26=Door function control keypad
28=Watershield sheet
30=Door module
32=Enclosure
34=Interior chamber of enclosure
36=Inboard wall
$36_{IS}$=Inboard (passenger-side) surface of inboard wall
37=Flangelike trim portion of inboard wall
38=Outboard wall
$38_{OS}$=Outboard surface of outboard wall
40=Forward wall
42=Rearward wall
44=Bottom wall
46=Top wall
$46_H$=Horizontal portion of top wall
$46_I$=Inclined portion of top wall
47=Enclosure periphery [shown in dashed lines]
48=First hole in inboard wall
50=Recessed trough
52=Gasket
54=Means for fastening (e.g., flange)
56=Fastening hole in means for fastening
58=Second hole in inboard wall
60=Tube between inboard/outboard walls
62=Inboard end of tube
64=Outboard end of tube
66=Through-hole through tube and enclosure
68=Kiss-off region
70=Inboard-extending protuberance
72=Outboard-extending protuberance
74=Integral mounting bracket (IMB)
76=Root portion of IMB
78=Intermediate portion of IMB
80=Distal portion of IMB
82=First folding line/living hinge
84=Second folding line/living hinge
86=Angled wall
$86_L$=Lower edge of angled wall
$86_U$=Upper edge of angled wall
$86_I$=Inboard edge of angled wall
$86_O$=Outboard edge of angled wall
88=Flange portion
90=First (inboard) wall of flange portion
92=Second (outboard) wall of flange portion
94=Forward flange wall/edge
96=Top flange wall/edge
98=Flange interior volume
100=Depression in inboard wall
102=Groove in enclosure wall for receiving trim panel
$W_{AW}$=Width of angled wall
$W_O$=Overall width of enclosure near angled wall The door module 30 is preferably a blow-molded structure, but may also be produced by injection molding, bonding together two thermoformed/vacuum formed panels, brazing/welding/crimping together two sheet metal panels, etc.

The volume V of the interior chamber 34 is preferably at least 10 liters, in order to make the enclosure 32 a suitable audio enclosure for the first audio speaker assembly $20_1$, which is preferably a sub-woofer. A sub-woofer is typically a relatively large speaker (e.g., 6- to 8-inch in diameter) designed to produce very low frequency audio (e.g., below 60 Hz). Although the first audio speaker assembly $20_1$ may comprise one or more speakers which might not be considered "sub-woofers" (e.g., woofers, mid-ranges, tweeters), a sub-woofer is the preferred option.

Figure 8:
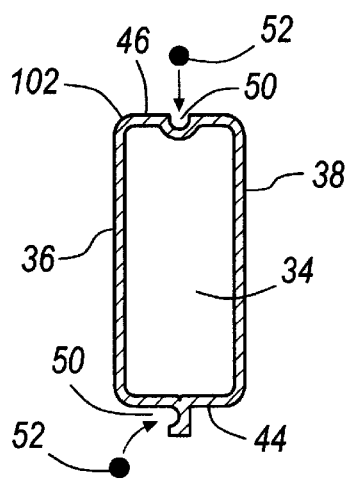
FIG. 8 is an exploded end section view of a door module according to the present invention, as seen from a rearward viewpoint.

As shown in FIG. 8, the enclosure 32 may include a recessed trough 50 defined in the forward, rearward, and bottom walls 40/42/44 (and optionally in the top wall 46 as well). In this trough, a gasket 52 or other sealing means may be provided for sealing the enclosure 32 against the door 10 when installed therein. This gasket 52 may be useful for sealing out noise, water, vibration, and the like.

In order to provide the volume that is desired in order to make the door module 30 a suitable sub-woofer enclosure, the enclosure 32 is sized so as to fill out a large portion of the door. Generally, the enclosure 32 may be dimensioned according to either of two configurations. In a first configuration, the enclosure is dimensioned such that when the enclosure is installed within the door, the generally horizontal portion $46_H$ of the top wall is disposed proximate an armrest portion $10_A$ of the door, the outboard wall 38 is disposed inboard of and proximate the inner structural wall 14 of the door 10, and the forward, rearward, and bottom walls 40/42/44 are disposed proximate corresponding forward, rearward, and bottom edges $10_F/10_R/10_B$ of the door, respectively. In a second configuration, the enclosure 32 is dimensioned such that when the enclosure is installed within the door, the generally horizontal portion $46_H$ of the top wall is disposed proximate the armrest portion $10_A$ of the door, at least a portion of the outboard wall 38 extends through the inner structural wall 14 and is disposed inboard of and proximate the window glass plane 16, and at least two of the forward, rearward, and bottom walls 40/42/44 are disposed proximate corresponding forward, rearward, and bottom edges $10_F/10_R/10_B$ of the door, respectively. In either configuration, optimum utilization is made of the available space within the door 10, so as to provide the desired volume for the door module 30. It should be noted, however, that although these are preferred configurations, other configurations are also possible according to the present invention.

The module 30 may further include some means 54 for fastening the enclosure 32 within the door. A preferred fastening means including a plurality of flanges extending outward from at least one of (and preferably each of) the top, bottom, forward, and rearward walls, wherein each flange includes a fastening hole 56 defined there through.

In addition to the first hole 48 defined in the inboard wall 36, a second hole 58 may also be defined therein for sealably receiving a second audio speaker assembly $20_2$ therein. For example, the first speaker assembly $20_1$ may comprise a sub-woofer, while the second assembly $20_2$ may comprise a mid-range and tweeter assembly. Like the first hole 48, the second hole 58 may communicate with the interior chamber 34 of the door module enclosure 32, such that both the first and second speaker assemblies may share the chamber 34 as a resonator, etc. However, if it is desired that the second hole 58 and second speaker assembly 202 not communicate with the interior chamber 34 (i.e., only the first speaker assembly $20_1$ communicates with the chamber 34), then another configuration may be provided. In this other configuration, the enclosure 32 includes a tube 60 contiguous at an inboard end 62 thereof with the inboard wall 36 and contiguous at an outboard end 64 thereof with the outboard wall 38, thereby defining a through-hole 66 through the tube 60 and the enclosure 32. In this configuration, the through-hole 66 does not communicate with the enclosure's interior chamber 34. The walls of the tube 60 should be dimensioned so as to fastenably receive the second speaker assembly $20_2$ therein.

Figure 9:
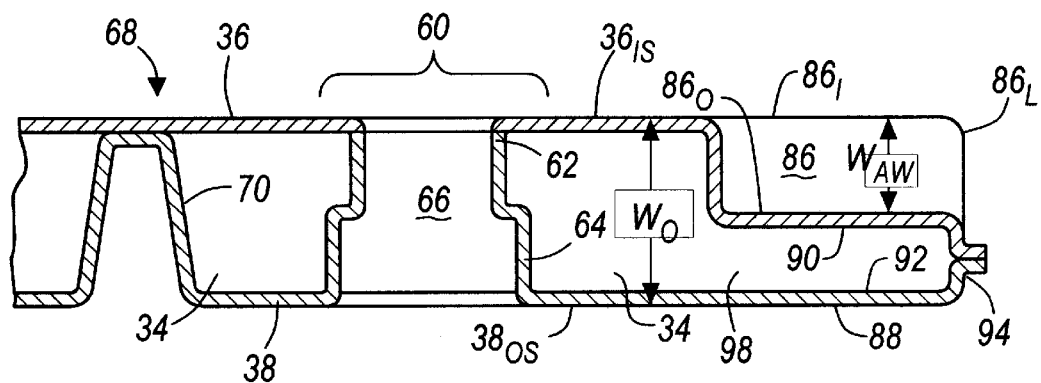
FIG. 9 is a top sectional view of along line 9—9 in FIG. 2 according to the present invention.
Figure 10:
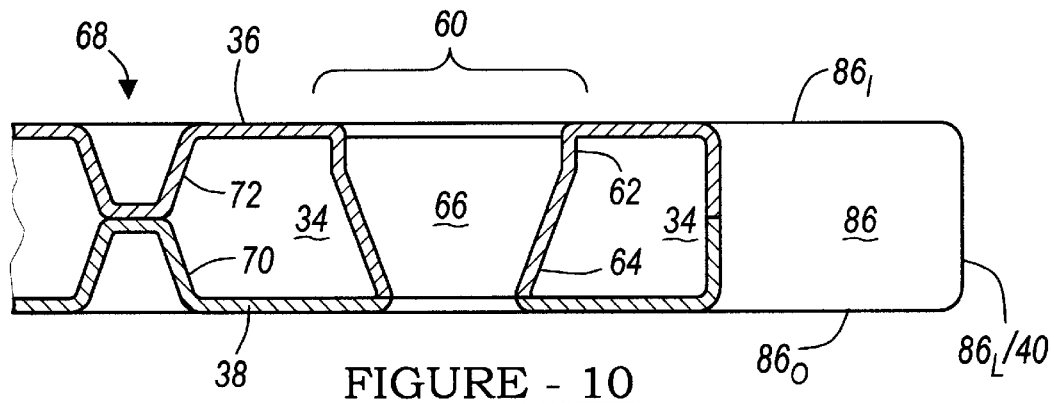
FIG. 10 is a top sectional view of along line 10—10 in FIG. 4 according to the present invention.

The through hole 66 may be dimensioned so as to transition from an enlarged opening at one of the tube's inboard and outboard ends 62/64 to a reduced opening at the other of the tube's ends 64/62, as illustrated in FIGS. 9–10. With the through hole 66 configured in this way, the second speaker assembly $20_2$ may be inserted into the enlarged opening of the tube and fastenably mounted therein. The transition between the enlarged and reduced tube openings may have a general "T" shape as shown in FIG. 9, or a general conical shape as shown in FIG. 10, or any other suitable shape.

As illustrated in FIGS. 9–10, the enclosure 32 may optionally include at least one kiss-off region 68. Each kiss-off 68 may include an inboard-extending protuberance 70 in the outboard wall 38, or an outboard-extending protuberance 72 in the inboard wall 36, or both. In any case, the inboard and outboard walls 36/38 contact each other at each kiss-off region, thereby imparting added structural rigidity to the enclosure. This feature may be provided regardless of whether the enclosure is a single molded piece or two panels joined together.

Figure 2:
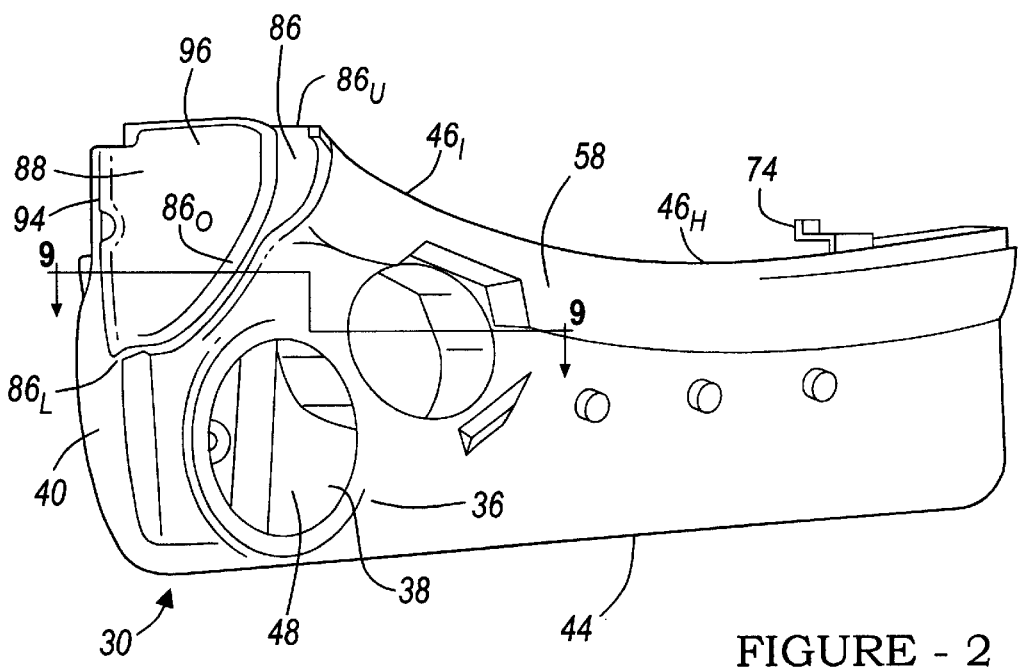
FIG. 2 is a perspective view of a door module for an automotive vehicle according to the present invention, as seen from an inboard viewpoint.
Figure 3:
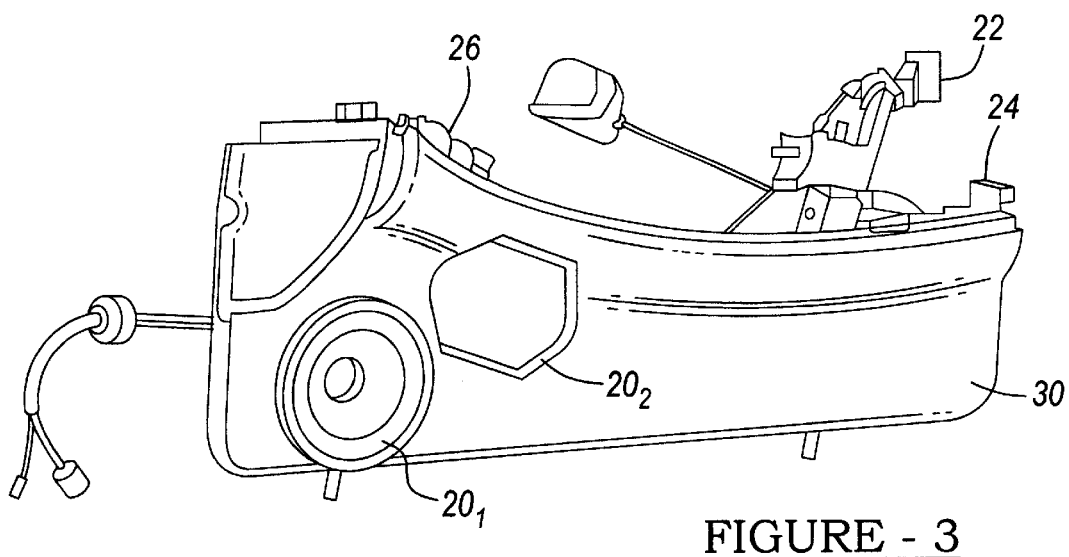
FIG. 3 is an assembled perspective view of the door module shown in FIG. 2.
Figure 4:
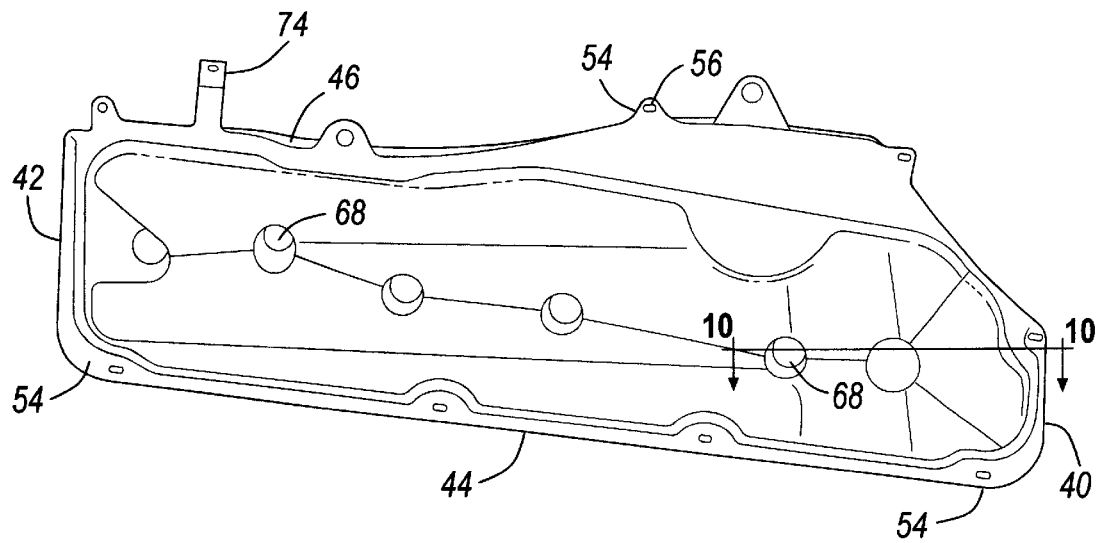
FIGS. 4 and 5 are unassembled and assembled perspective views, respectively, of a door module according to the present invention, as seen from an outboard viewpoint.
Figure 5:
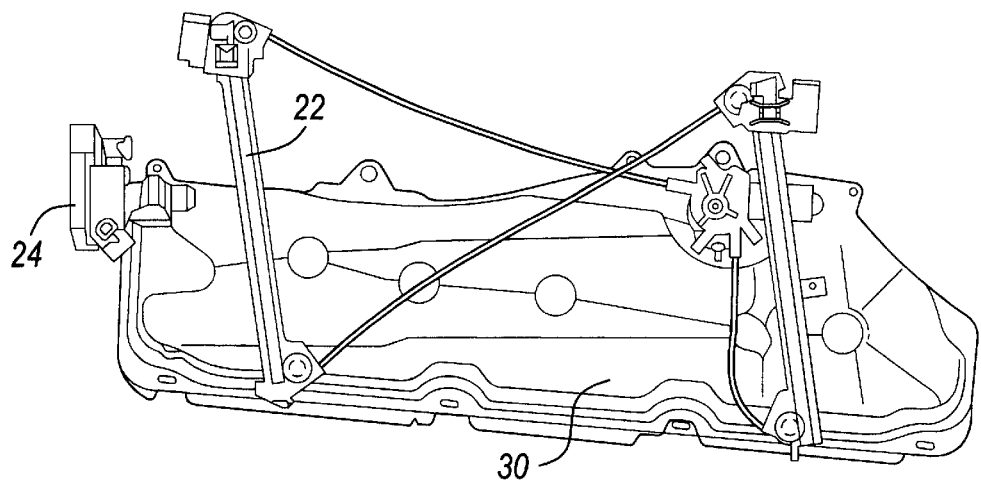
Figure 6:
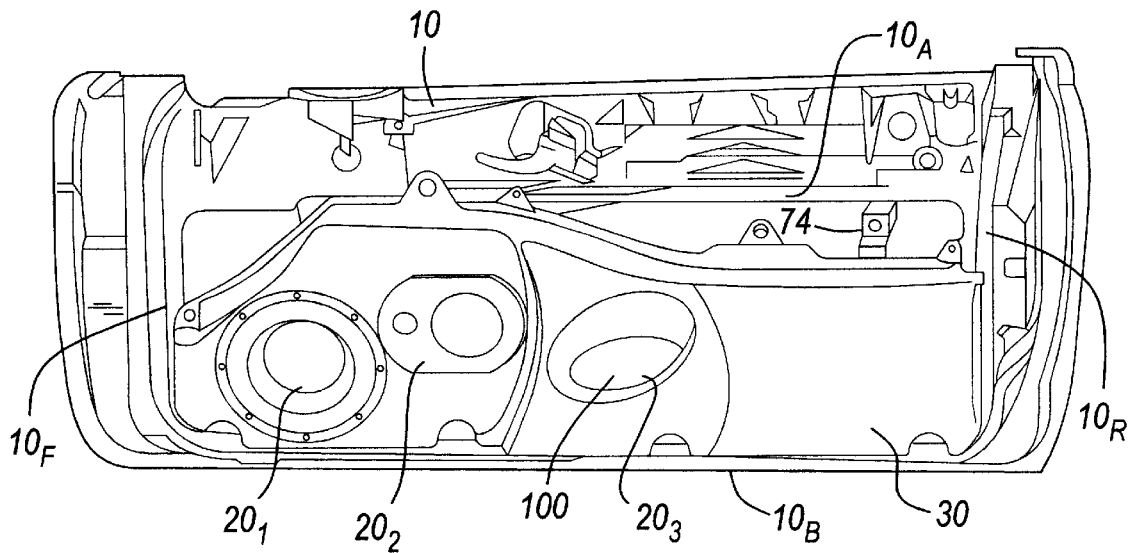
FIGS. 6 and 7 are inboard and inboard views, respectively, of a door module assembled into a door of an automobile vehicle according to the present invention.
Figure 7:
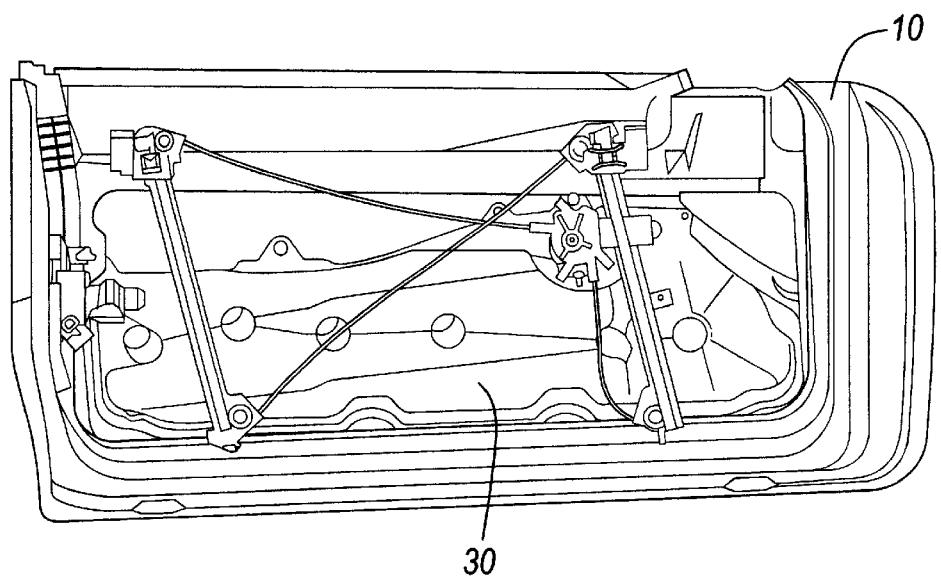
Figure 11:
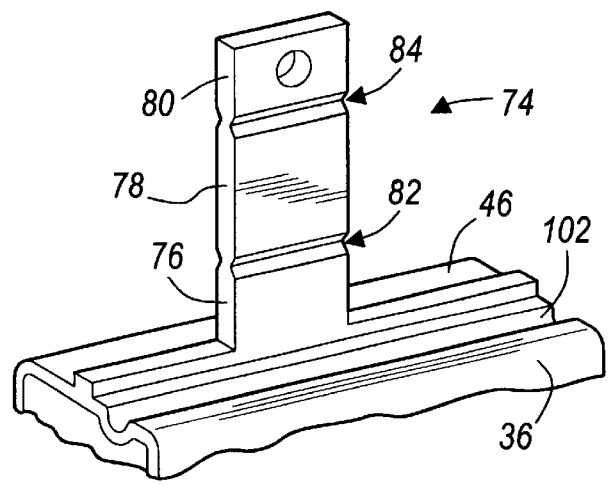
FIG. 11 is a close-up perspective views of an integral mounting bracket of the door module before being folded about its folding lines.

FIGS. 4 and 11 show an integral mounting bracket 74 (IMB) extending outward from the top wall 46 of the enclosure. The IMB 74 comprises: a root portion 76 which is integral with (and extending outward from) the top wall; an intermediate portion 78 integral with and connected at a first folding line 82 to the root portion 76; and a distal portion 80 integral with and connected at a second folding line 84 to the intermediate portion 78. First and second living hinges may be provided at the folding lines 82/84 so as to be foldable along/about the folding lines 82/84. (E.g., each living hinge may comprise a reduced thickness region along each folding line, thereby facilitating folding/hinging of the IMB portions about these folding lines.) As illustrated in FIG. 2, the intermediate portion 78 may be folded at the first folding line 82 so as to extend generally parallel to the top wall 46 (i.e., generally horizontally), and the distal portion 80 may be folded about the second folding line 84 so as to extend generally orthogonal to the intermediate portion (i.e., generally vertically). The distal portion 80 may be folded "upwards" as illustrated in FIGS. 2, 3 and 6, or "downwards". As shown in FIGS. 3 and 6, a window regulator system 22 may be operatively attached to the folded distal portion of the IMB.

In addition to the forward, rearward, top, and bottom walls 40/42/46/44 which define the enclosure periphery 47 (as viewed from an inboard or outboard side view), the enclosure 32 may further include an angled wall 86 extending from a lower edge $86_L$ thereof contiguous with the forward wall 40 to an upper edge $86_U$ thereof contiguous with the top wall 46. The angled wall 86 may be "unflanged", as in 4–7, or may be "flanged", as in FIGS. 2–3; in either case, the angled wall 86 (and optional flange portion 88) may be configured so as to mate up with the corresponding outboard edge of an instrument panel or dashboard of the automotive vehicle.

In the "flanged" configuration illustrated in FIGS. 2–3, the angled wall 86 typically extends from an inboard edge $86_I$ thereof contiguous with the inboard wall 36 to an outboard edge $86_O$ thereof along an inboard-to-outboard width $W_{AW}$. Proximate the angled wall 86, the enclosure has an overall width $W_O$ (as measured from an inboard/passenger-side surface $36_{IS}$ of the inboard wall 36 to an outboard surface $38_{OS}$ of the outboard wall 38), such that $W_{AW} < W_O$. The flange portion 88 has first (inboard) and second (outboard) walls 90/92, with the first wall 90 being contiguous with the outboard edge $86_O$ of the angled wall 86, the second wall 92 being contiguous with the outboard enclosure wall 38, and the first and second walls, 90/92 extending generally parallel to the outboard wall. The first and second walls 90/92 may be generally flat and planar, or one or both may be somewhat curved/non-planar. Additionally, the flange portion 88 may have a generally vertical forward flange wall/edge 94 generally coextensive with the forward wall 40 of the enclosure, and a generally horizontal top flange wall/edge 96 generally contiguous with the upper edge $86_U$ of the angled wall 86.

The flange portion's first and second walls 90/92 may be spaced apart from one another, thereby defining a flange interior volume 98 therebetween; this flange interior volume 98 may be open to and communicate with the interior chamber 34 of the enclosure, thereby providing additional interior volume in communication with the first hole 48 and the first speaker assembly $20_1$ sealably mounted therein. Alternatively, the first and second walls 90/92 may be sandwiched together in generally intimate contact with each other.

Instead of or in addition to the second hole 58 in the inboard wall 36 described above, the inboard wall may include a depression 100 therein for fastenably receiving a third speaker assembly $20_3$ therein. This depression may be shaped so as to provide, in effect, a resonance chamber for the third speaker assembly, with this resonance chamber being separate from (i.e., not in communication with) the interior chamber 34 of the enclosure 32.

With the foregoing door module 30 configured as described, additional door hardware may optionally be attached thereto. For example, the door module may include a window regulator system 22 operatively attached to the outboard wall 38, a door latching system 24 operatively attached to the outboard and/or rearward wall 38/42, a door function control keypad 26 operatively attached to the top wall 46 (especially to the inclined or forward portion thereof), a watershield sheet 28 sealably attached to the outboard/forward/rearward/top/bottom wall(s), and so forth. Thus, such hardware may be attached to the door module 30 and sold all together as a single, drop-in unit to OEM automobile manufacturers. This all-in-one, drop-in package may significantly reduce the number of fastening components required, the number of total components that need to be bought, stored, and tracked, the amount of handling and installation labor required by automobile assemblers, and so forth, while providing improved in-vehicle audio performance, overall cost savings, and other advantages.

As illustrated in FIGS. 12–15, the enclosure 32 may also be configured so as to provide a flangelike trim portion 37 integral with the inboard wall 36. This flangelike trim portion 37 may be disposed adjacent any one or more of the top, bottom, forward, and rearward walls and may extend generally outward beyond the enclosure periphery 47, as shown schematically in FIGS. 12–15. While in most cases it is preferable that the flangelike trim portion extend from and along the entire length of any of the top, bottom, forward, and rearward walls, it may sometimes be desirable to provide a break in the otherwise continuous contact of the trim portion 37 with any particular wall along the enclosure periphery 47. In general, if a flangelike trim portion 37 is to be provided along any periphery wall 40/42/44/46, it is preferable that it extend along and adjacent at least half of such wall.

Regardless of whether the enclosure 32 includes such an integral flangelike trim portion 37, some portion (or optionally the entirety) of the inboard (passenger-side) surface $36_{IS}$ of the inboard wall 36 may be provided with a decorative, "Class A" finish. This may include special graining or texture to the inboard surface $36_{IS}$—for example, if the enclosure is molded—or other surface features which present an attractive appearance. In this way, the typical lower trim panel common in present-day automobiles may be eliminated. Additionally, the enclosure may include a groove 102 defined in one or more of the top, bottom, forward, rearward, inboard, and outboard walls; each groove 102 is dimensioned and located such that an edge of the door trim panel 18 may be received therein. For example, the bottom edge of an upper trim panel may be received into a groove 102 which is defined in and runs along the top wall 46 of the enclosure, or which may be defined in and running along the upper edge of the inboard wall 36.

It should be noted that various words relating to direction or orientation—e.g., upward, downward, top, bottom, forward, rearward, inboard, outboard, horizontal, vertical, etc.—are used in reference to how the door module 30 is ultimately installed in the door of an automotive vehicle. Also, it should be noted that the word "wall" as used in referring to the top, bottom, forward, and rearward walls 46/44/40/42 may also or instead include a sharp or rounded "edge", and not simply a flat wall as in the conventional meaning of the word.

Various other modifications to the present invention may occur to those skilled in the art to which the present invention pertains other modifications not explicitly mentioned herein are also possible and within the scope of the present invention. It is the following claims, including all equivalents, which define the scope of the present invention.

What is claimed is:

1. A door module for a door of an automotive vehicle comprising: an enclosure having an interior chamber defining an interior volume, opposed generally vertical inboard and outboard walls, opposed generally vertical forward and rearward walls, a generally horizontal bottom wall, and a top wall, wherein said top wall transitions from a generally horizontal portion thereof proximate said rearward wall to a generally inclined portion thereof proximate said forward wall;

said inboard wall having a first hole defined therein for sealably receiving a first audio assembly, wherein the first hole communicates with said interior chamber;

wherein said enclosure includes at least one integral mounting bracket extending outward from said generally horizontal portion of said top wall wherein said integral mounting bracket comprises:

a root portion integral with and extending outward from said top wall;

an intermediate portion integral with and connected at a first folding line to said root portion; and a distal portion integral with and connected at a second folding line to said intermediate portion.

2. A door module according to claim 1, further comprising a first living hinge foldable along said first folding line, and a second living hinge foldable along said second folding line.

3. A door module according to claim 1, wherein said intermediate portion may be folded at said first folding line so as to extend generally parallel to said generally horizontal portion of said top wall, and wherein said distal portion may be folded at said second folding line so as to extend generally orthogonal to said intermediate portion.

4. A door module according to claim 3, further including a window regulator system operatively attached to said distal portion of said mounting bracket.

5. A door module for a door of an automotive vehicle comprising: an enclosure having an interior chamber defining an interior volume, opposed generally vertical inboard and outboard walls, opposed generally vertical forward and rearward walls, a generally horizontal bottom wall, and a top wall, wherein said top wall transitions from a generally horizontal portion thereof proximate said rearward wall to a generally inclined portion thereof proximate said forward wall; wherein said enclosure has an enclosure periphery defined by said top, bottom, forward, and rearward walls, and wherein said inboard wall includes an integral trim portion, wherein said integral trim portion is shaped as a flange such that said integral trim portion is adjacent at least one of said top, bottom, forward, and rearward walls and extending generally outward beyond said enclosure periphery, wherein said trim portion extends along at least half of said at least one of said, top, bottom, forward, and rearward walls.

\* \* \* \* \*